(12) United States Patent
Yan et al.

(10) Patent No.: US 11,187,387 B1
(45) Date of Patent: Nov. 30, 2021

(54) COLOR-CONTROLLABLE LED LUMINESCENT LAMP

(71) Applicant: Hangzhou Hangke Optoelectronics Group Co., Ltd., Hangzhou (CN)

(72) Inventors: Qianjun Yan, Hangzhou (CN); Zhaozhang Zheng, Hangzhou (CN); Lingli Ma, Hangzhou (CN)

(73) Assignee: Hangzhou Hangke Optoelectronics Group Co., Ltd., Hangzhou (CN)

( * ) Notice: Subject to any disclaimer, the term of this patent is extended or adjusted under 35 U.S.C. 154(b) by 0 days.

(21) Appl. No.: 17/109,658

(22) Filed: Dec. 2, 2020

(30) Foreign Application Priority Data

Aug. 31, 2020 (CN) .......................... 202010896294.6
Oct. 10, 2020 (CN) .......................... 202011078412.9

(51) Int. Cl.
*F21K 9/238* (2016.01)
*F21K 9/232* (2016.01)
*H05B 45/20* (2020.01)
*F21Y 105/10* (2016.01)
*F21Y 115/10* (2016.01)

(52) U.S. Cl.
CPC .............. *F21K 9/238* (2016.08); *F21K 9/232* (2016.08); *H05B 45/20* (2020.01); *F21Y 2105/10* (2016.08); *F21Y 2115/10* (2016.08)

(58) Field of Classification Search
CPC ................................. F21K 9/238; F21K 9/232
See application file for complete search history.

(56) References Cited

U.S. PATENT DOCUMENTS

| | | | | |
|---|---|---|---|---|
| 6,523,978 | B1* | 2/2003 | Huang | F21V 3/00 313/500 |
| 7,354,174 | B1* | 4/2008 | Yan | H05B 45/37 362/249.16 |
| 10,563,824 | B2* | 2/2020 | Yeung | F21K 9/90 |
| 10,753,548 | B2* | 8/2020 | On | F21K 9/232 |
| 10,767,816 | B1* | 9/2020 | Wu | F21K 9/232 |
| 10,794,543 | B2* | 10/2020 | Yeung | H01L 25/0753 |
| 2005/0162850 | A1* | 7/2005 | Luk | F21S 4/26 362/227 |
| 2009/0050907 | A1* | 2/2009 | Yuan | H01L 33/54 257/88 |
| 2011/0050073 | A1* | 3/2011 | Huang | F21S 4/26 313/46 |
| 2012/0169251 | A1* | 7/2012 | Lai | F21K 9/232 315/294 |
| 2012/0268936 | A1* | 10/2012 | Pickard | F21K 9/90 362/249.02 |
| 2013/0265796 | A1* | 10/2013 | Kwisthout | F21K 9/61 362/555 |
| 2013/0271981 | A1* | 10/2013 | Hussell | F21V 19/003 362/235 |
| 2014/0247596 | A1* | 9/2014 | Scianna | G09G 3/14 362/249.06 |

(Continued)

*Primary Examiner* — William N Harris
(74) *Attorney, Agent, or Firm* — Schwegman Lundberg & Woessner, P.A,

(57) ABSTRACT

The disclosure relates to a color-controllable LED luminescent lamp. By adopting a mini-LED chip with a small size to form an LED light source, the number of LED light sources that can be accommodated by a lamp shade is increased, so that the whole LED luminescent lamp can exhibit more types of colors and realize a free exhibiting and switching of multiple colors.

12 Claims, 13 Drawing Sheets

(56) References Cited

U.S. PATENT DOCUMENTS

| | | | |
|---|---|---|---|
| 2015/0069442 A1* | 3/2015 | Liu | H01L 33/504 |
| | | | 257/98 |
| 2016/0238199 A1* | 8/2016 | Yeung | G09F 23/00 |
| 2016/0369952 A1* | 12/2016 | Weekamp | F21K 9/64 |
| 2016/0377237 A1* | 12/2016 | Zhang | H01L 33/62 |
| | | | 362/311.02 |
| 2017/0012177 A1* | 1/2017 | Trottier | F21K 9/00 |
| 2017/0191623 A1* | 7/2017 | Ma | F21K 9/237 |
| 2019/0137047 A1* | 5/2019 | Hu | F21K 9/90 |
| 2020/0144230 A1* | 5/2020 | Lin | F21K 9/232 |

\* cited by examiner

COLOR-CONTROLLABLE LED LUMINESCENT LAMP

CROSS-REFERENCE TO RELATED APPLICATIONS

This Non-provisional application claims priority under 35 U.S.C. § 119(a) to Chinese Patent Application No. 202010896294.6 filed on Aug. 31, 2020, and to Chinese Patent Application No. 202011078412.9, filed Oct. 10, 2020, the entire contents of each of which are hereby incorporated by reference in their entirety.

TECHNICAL FIELD

The disclosure relates to a technical field of a light emitting device, in particular to color-controllable LED luminescent lamp.

BACKGROUND ART

An LED filament is a common light emitting device, which has a wide-ranging use and a low cost, and can meet lighting requirements in most cases. However, as demands from residents are increasing, the LED filament capable of emitting light of a plurality of different colors is a hot research field.

A traditional LED filament is generally composed of a blue chip, a ceramic substrate and a phosphor. Metal pins are fixedly provided at two ends of a ceramic substrate and used as connecting media of the LED lamp filament with other parts. A plurality of blue chips is arranged at intervals on a surface of the ceramic substrate, and the plurality of blue chips and the ceramic substrate forms a light emitting component. And then the phosphor is covered or filled on a surface of the light emitting component to form an LED filament.

However, there is a serious problem with a traditional LED luminescent lamp, that is, its color exhibiting mode is single and it is difficult to realize a free exhibiting and switching of multiple colors. This is because most of traditional blue light chips have a chip width of more than 0.6 mm, which is a large size, and this leads to a large overall diameter of the finally manufactured LED filament. An inner space of the bulb is limited, and therefore the number of the LED filaments placed inside the bulb is also limited, which makes it difficult for the traditional LED luminescent lamp to exhibit a large number of colors, and makes it difficult to realize the free exhibiting and switching of the multiple colors.

SUMMARY

On this basis, it is necessary to provide a color-controllable LED luminescent lamp regarding a problem with the traditional LED luminescent lamp that a color exhibiting mode is single and it is difficult to realize a free exhibiting and switching of the multiple colors.

The disclosure provides a color-controllable LED luminescent lamp, which includes:
a lamp shade;
a stem fixedly connected with the lamp shade;
a base fixedly connected with the lamp shade; and
at least one LED light source fixedly connected with the stem;
wherein
a plurality of LED chips is provided inside the LED light source, and a chip width of one of the LED chips ranges from more than 25.4 microns to less than 600 microns.

In an embodiment, one or more of a LED red light source, a LED green light source, a LED blue light source and a LED white light source are provided in the LED light source.

In an embodiment, the LED red light source, the LED green light source, the LED blue light source and the LED white light source are manufactured with LED chips coated, on a surface thereof, with an adhesive mixed with a phosphor.

In an embodiment, the LED light source is an LED filament which includes a filament substrate. A plurality of connecting lines is provided on the filament substrate, and each of the connecting lines is one of the LED red light source, the LED green light source, the LED blue light source and the LED white light source, and each of the connecting lines is independently controlled to control the LED filament to emit a specific color of light.

In an embodiment, a plurality of LED chips is provided on each of the connecting lines, and two adjacent LED chips are connected with each other through a wire.

In an embodiment, a dam-encircling colloid coating is provided between two adjacent connecting lines.

In an embodiment, the LED filament includes:
a red light electrode provided to extend from a first end of the filament substrate;
a green light electrode provided to extend from the first end of the filament substrate;
a blue light electrode provided to extend from the first end of the filament substrate;
a white light electrode provided to extend from the first end of the filament substrate;
a common electrode provided to extend from the first end or a second end of the filament substrate.

In an embodiment, the plurality of LED filaments shares a same common electrode, and the common electrode serves as one or more of input ends and output ends of all the LED filaments;

The second end of the filament substrate for each LED filament is connected with the common electrode, and the common electrode is fixedly connected with an end of the stem;

the common electrode being provided to extend from the first end or the second end of the filament substrate.

In an embodiment, the LED light source includes the plurality of LED filaments, the second end of the filament substrate for each LED filament is connected with a same common electrode, and the common electrode is fixedly connected with the end of the stem.

First ends of the filament substrates for a plurality of LED filaments all extend rotationally around a same central axis, and a rotation angle of the first end of the filament substrate for each LED filament relative to the second end of the filament substrate is greater than 720 degrees.

In an embodiment, the LED light source is a light emitting array which is fixedly connected with the stem for displaying a field or graphic with a color. The light emitting array is composed of a plurality of light emitting units and an array substrate, and the plurality of light emitting units is arranged on the array substrate in an array and fixed on the array substrate.

In an embodiment, the light emitting unit is composed of one or more of a LED red light source, a LED green light source, a LED blue light source and a LED white light source.

In an embodiment, the light emitting array further includes:

an input end of the array, a part of which is fixed on the array substrate and another part of which extends from the array substrate, the input end of the array being connected with an output end of a driver;

an output end of the array, a part of which is fixed on the array substrate and another part of which extends from the array substrate, the output end of the array being fixedly connected with the stem.

In an embodiment, the array substrate is a flexible substrate so that the light emitting array is capable of being bent or folded.

In an embodiment, the light emitting array is provided in a bendable curved structure so as to be inserted into an interior of the lamp shade from an inlet of the lamp shade, the light emitting array is capable of extending inside the lamp shade to form a two-dimensional planar structure or a three-dimensional structure.

The disclosure relates to a color-controllable LED luminescent lamp. By adopting a mini-LED chip with a small size to form an LED light source, the number of LED light sources that can be accommodated by a lamp shade is increased, so that the whole LED luminescent lamp can exhibit more types of colors and realize a free exhibiting and switching of multiple colors.

REFERENCE NUMBER

10—Lamp Shade; 20—Stem; 30—Base; 40—LED Light Source; 400—LED Chip; 410—LED Filament;

411—Filament Substrate; 411a—First End; 411b—Second End; 412—Connecting Line;

413—Red Light Electrode; 414—Green Light Electrode; 415—Blue Light Electrode; 416—White Light Electrode;

417—Common Electrode; 418—Dam-encircling Colloid Coating; 421—LED Red Light Source; 422—LED Green Light Source;

423—LED Blue Light Source; 424—LED White Light Source; 430—light Emitting Array; 431—Light Emitting Unit;

432—Array Substrate; 433—Input End of Array; 434—Output End of Array; 50—Driver;

510—Input End of Driver; 520—Input End of Driver; 521—LED Driving Electrode;

522—Red Light Driving Electrode; 523—Green Light Driving Electrode; 524—Blue Light Driving Electrode;

525—White Light Driving Electrode; 60—Controller.

DETAILED DESCRIPTION OF PREFERRED EMBODIMENTS

In order to make the objects, technical schemes and advantages of the present disclosure more clear, the present disclosure will be further described in detail with reference to the drawings and examples. It should be understood that the specific embodiments described herein are only used to explain the present disclosure and are not intended to limit the present disclosure.

The disclosure provides a color-controllable LED luminescent lamp.

Figure 1:
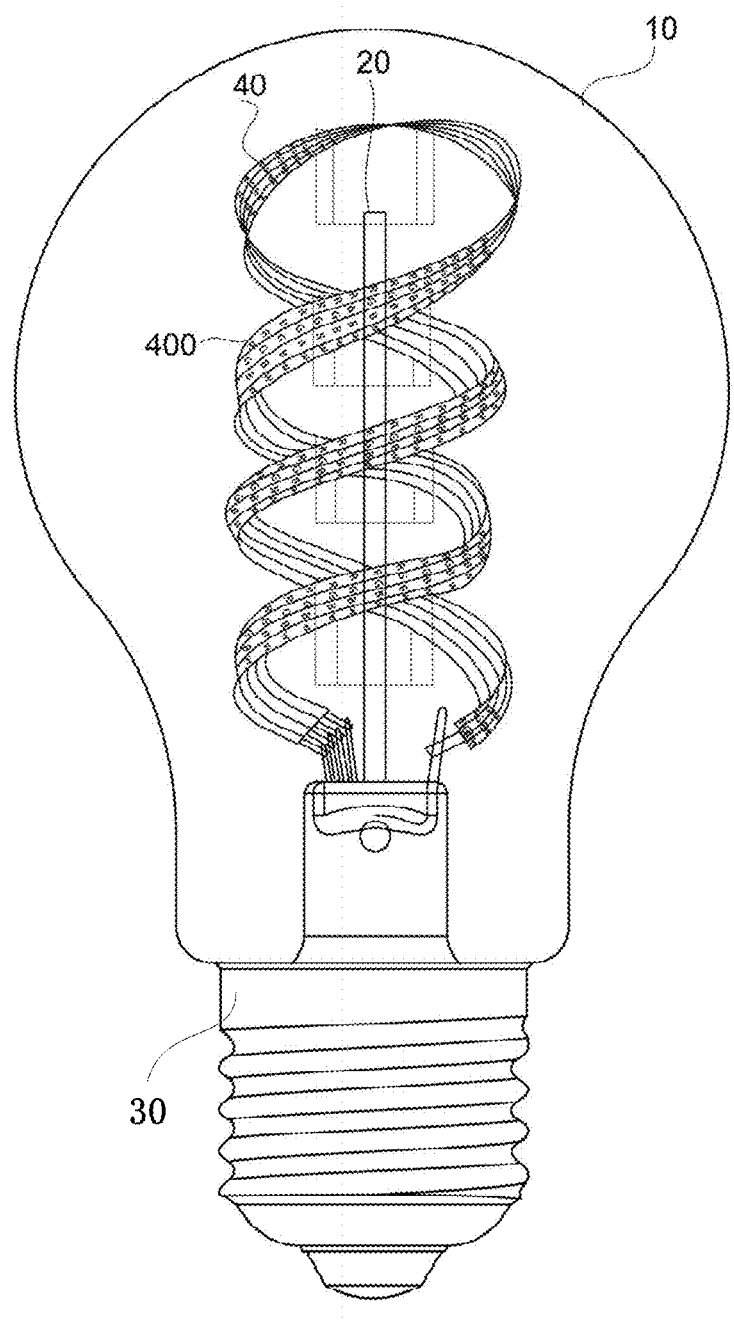
FIG. 1 is a structural schematic diagram of a color-controllable LED luminescent lamp according to an embodiment of the present disclosure.

As shown in FIG. 1, in an embodiment of the present disclosure, the color-controllable LED luminescent lamp includes a lamp shade 10, a stem 20, a base 30 and at least one LED light source 40. The stem 20 is fixedly connected with the lamp shade 10. The base 30 is fixedly connected with the lamp shade 10. Each of the at least one LED light source 40 is fixedly connected with the stem 20.

A plurality of LED chips 400 is provided inside the LED light source 40. A chip width of one of the LED chips 400 ranges from more than 25.4 microns to less than 600 microns.

Specifically, the lamp shade 10 and the stem 20 are vacuum sealed to form a vacuum sealed cavity, and this sealed cavity is filled with mixed gases. The lamp shade 10 and the stem 20 are integrated, and then are fixedly connected with the base 30. The chip width of the LED chip 400 ranges from more than 25.4 microns to less than 600 microns, so the LED chip 400 in this embodiment is a mini-LED chip and has a characteristic of a small size.

Understandably, the lamp shade 10 in this embodiment can accommodate more LED light sources 40 because of the small size of the LED light source 40. Furthermore, a combination mode and a circuit structure between the LED light sources 40 can be more complex, so that the whole LED luminescent lamp can exhibit more types of colors and realize a free exhibiting and switching of multiple colors.

Figure 2:
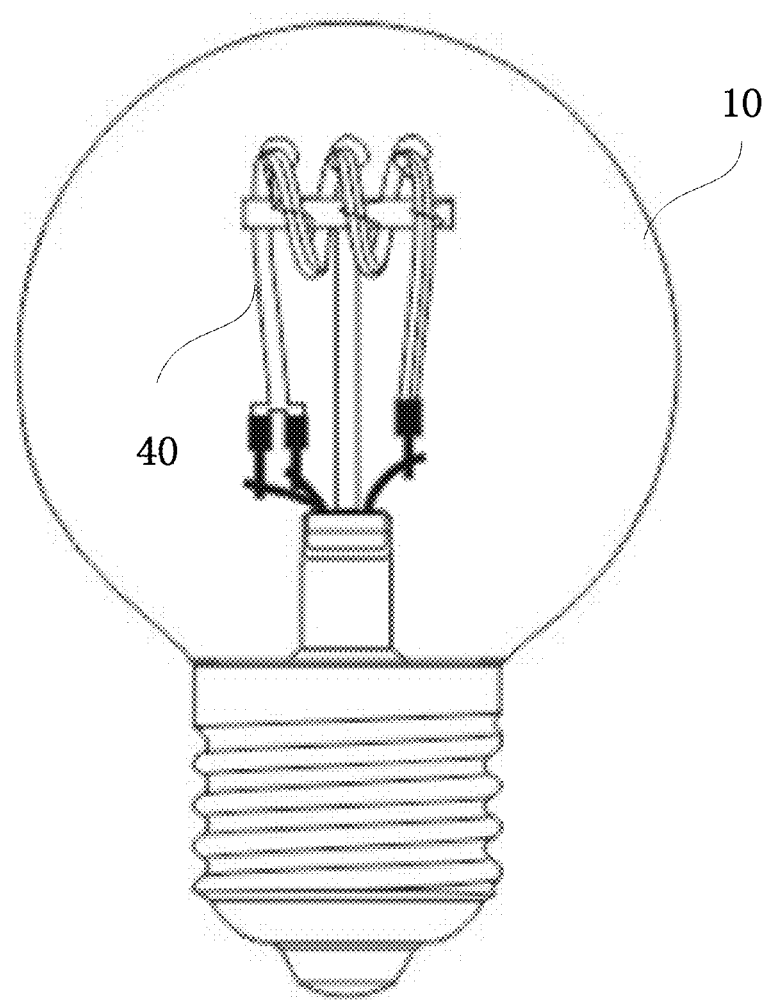
FIG. 2 is a structural schematic diagram of a color-controllable LED luminescent lamp according to an embodiment of the present disclosure.
Figure 3:
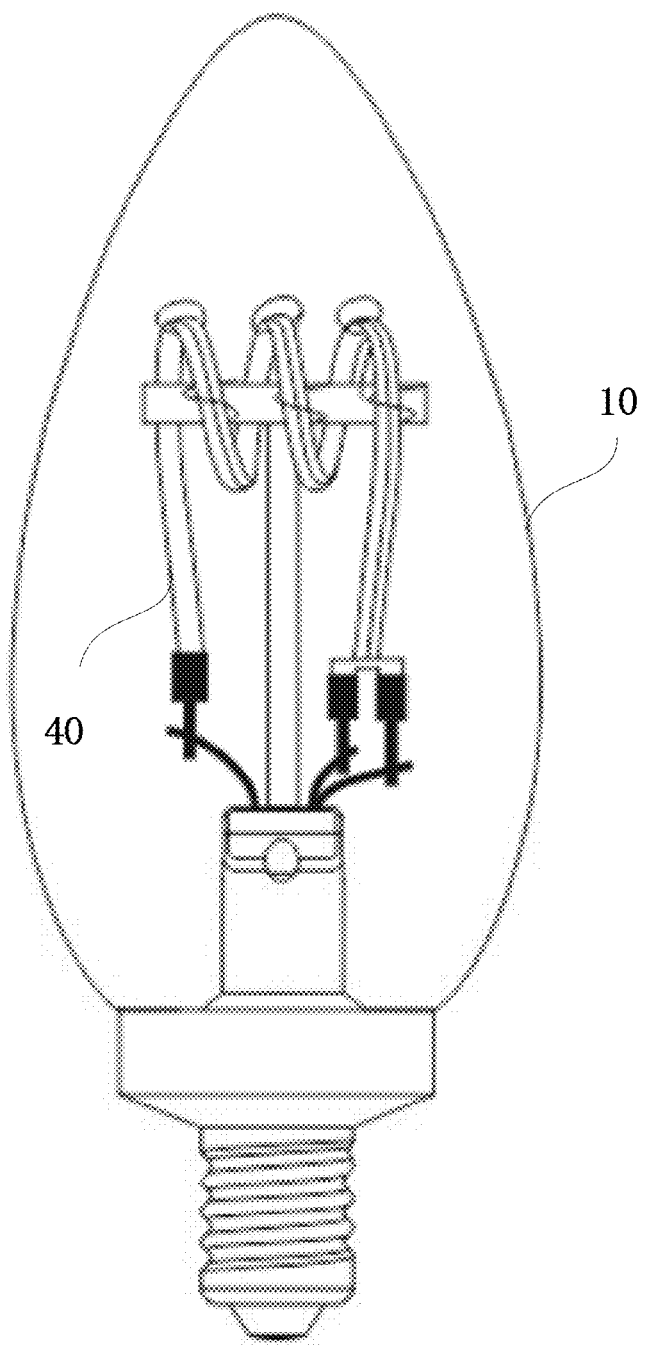
FIG. 3 is a structural schematic diagram of a color-controllable LED luminescent lamp according to an embodiment of the present disclosure.
Figure 4:
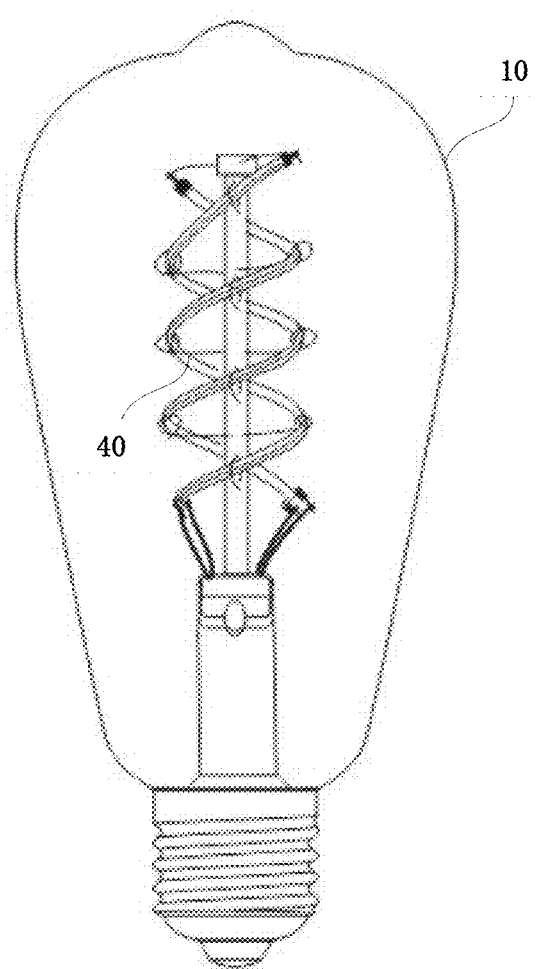
FIG. 4 is a structural schematic diagram of a color-controllable LED luminescent lamp according to an embodiment of the present disclosure.

FIGS. 2, 3 and 4 are structural schematic diagrams of color-controllable LED luminescent lamps according to different embodiments.

In this embodiment, by adopting a mini-LED chip 400 with a small size to form an LED light source 40, the number of LED light sources 40 that can be accommodated by a lamp shade 10 is increased, so that the whole LED luminescent lamp can exhibit more types of colors and realize a free exhibiting and switching of multiple colors.

Figure 5:
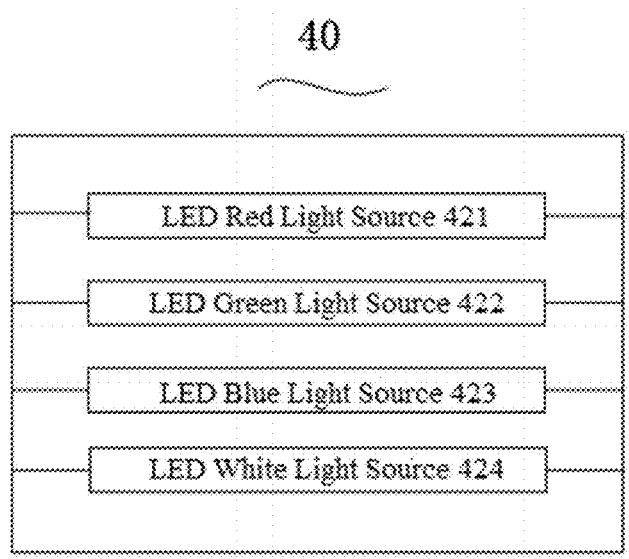
FIG. 5 is a structural schematic diagram of an LED light source in a color-controllable LED luminescent lamp according to an embodiment of the present disclosure.

As shown in FIG. 5, in an embodiment of the present disclosure, the LED light source 40 includes one or more of a LED red light source 421, a LED green light source 422, a LED blue light source 423 and a LED white light source 424.

Specifically, the LED light source 40 can be a combination of any one or more of the four color light sources. A type and number of the light source provided in the LED light source 40 are not limited, as long as various colors can be freely exhibited. For example, the LED light source 40 may include one LED red light source 421 and one LED green light source 422. As another example, the LED light source 40 may include one LED red light source 421, one LED green light source 422, one LED blue light source and one LED white light source 424.

In this embodiment, by providing one or more of the LED red light source 421, the LED green light source 422, the LED blue light source 423 and the LED white light source 424 in the LED light source 40, the whole LED luminescent lamp can exhibit more types of colors.

In an embodiment of this disclosure, the LED red light source 421, the LED green light source 422, the LED blue light source 423 and the LED white light source 424 are manufactured with LED chips 400 coated, on a surface thereof, with an adhesive mixed with a phosphor.

Specifically, in this embodiment, the light source for the four colors can all be manufactured with the LED chip 400 for any one color as a substrate coated, on a surface thereof, with an adhesive mixed with a phosphor, instead of with LED chips 400 for a corresponding color. For example, the LED red light source 421 can be manufactured with the blue chip coated, on a surface thereof, with an adhesive mixed with a phosphor, and emit red light. Of course, the LED red light source 421 can also be manufactured with a red chip without coating the adhesive mixed with the phosphor.

In this embodiment, by coating the adhesive mixed with the phosphor on the surface of the LED chip 400, the manufactured LED light source can have a different color temperature and emit a different color of light, with a low cost.

Figure 6:
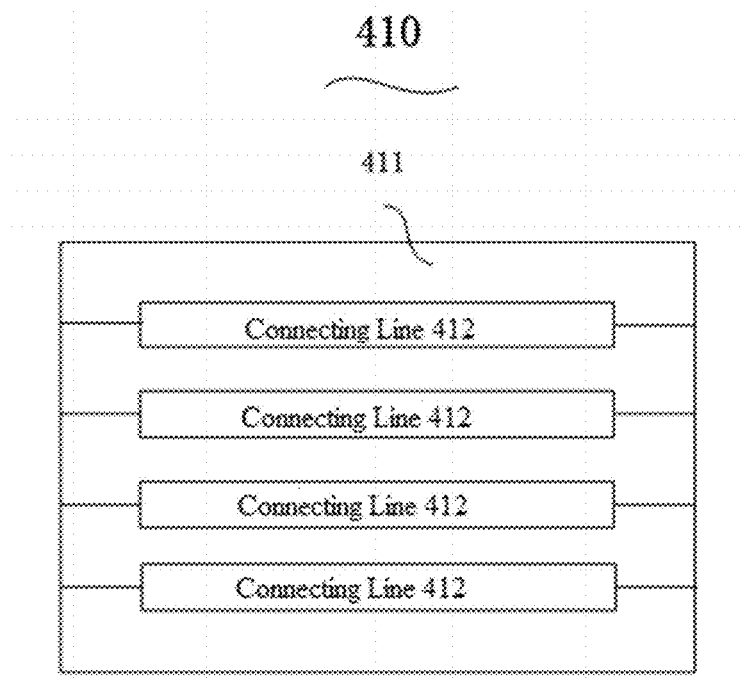
FIG. 6 is a structural schematic diagram of an LED filament in a color-controllable LED luminescent lamp according to an embodiment of the present disclosure.

As shown in FIG. 6, in an embodiment of the present disclosure, the LED light source 40 is an LED filament 410. The LED filament 410 includes a filament substrate 411. A plurality of connecting lines 412 is provided on the filament substrate 411. Each of the connecting lines is one of the LED red light source 421, the LED green light source 422, the LED blue light source 423 and the LED white light source 424. Each of the connecting lines 412 is independently controlled to control the LED filament 410 to emit a specific color of light.

Specifically, the LED light source 40 may be an LED filament 410. As mentioned in the foregoing embodiments, with a small size of the LED chip 400, an overall diameter of the LED light source 40 is small. In other words, the size of the LED filament 410 will be small. A diameter of a single LED filament 410 may be less than 1.5 mm.

In this embodiment, by providing the LED filament 410 including a plurality of connecting lines 412, and providing a plurality of LED chips 400 on each of the connecting lines 412, an overall size of the LED filament 410 is small, and then a plurality of LED filaments 410 is combined to form a point light source with a controllable color.

In an embodiment of the present disclosure, a plurality of LED chips 400 is provided on each of the connecting lines 412, and two adjacent LED chips 400 are connected with each other through a wire.

Specifically, it can be understood that an LED filament 410 may have only one connecting line 412 or have four connecting lines 412. Each of the connecting lines 412 is one of the LED red light source 421, the LED green light source 422, the LED blue light source 423 and the LED white light source 424. Optionally, an LED filament 410 may include four connecting lines 412 emitting different colors of light, and the four connecting lines 412 emit red light, green light, blue light and white light respectively. One connecting line 412 is a light source for one color.

Figure 7:
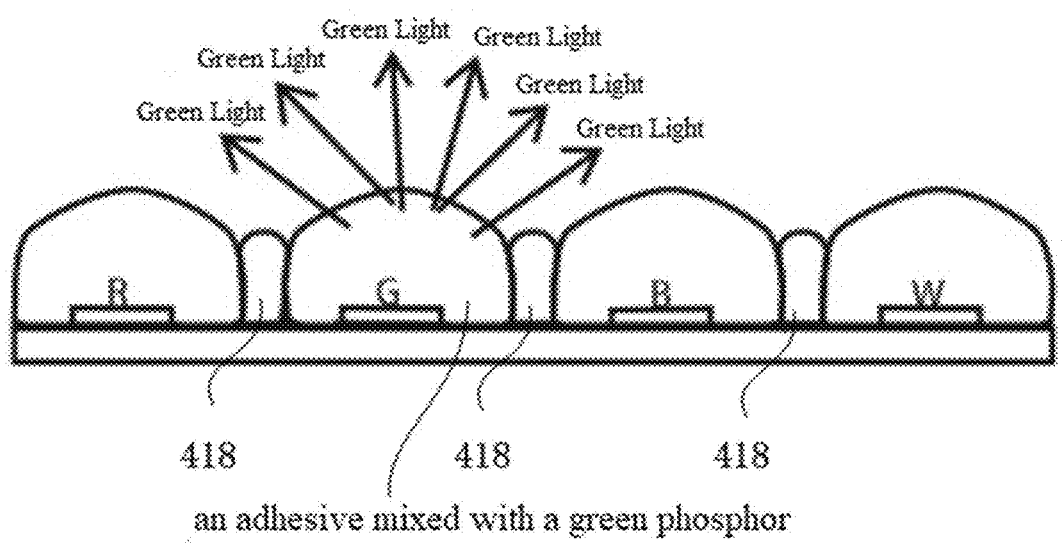
FIG. 7 is a structural schematic diagram of the LED filament after the dam-encircling colloid coating is provided between two adjacent connecting lines in a color-controllable LED luminescent lamp according to an embodiment of the disclosure.

As shown in FIG. 7, in an embodiment of the present disclosure, a dam-encircling colloid coating 418 is provided between two adjacent connecting lines 412.

Specifically, when the LED red light source 421, the LED green light source 422, the LED blue light source 423 and the LED white light source 424 are each manufactured with the LED chip 400 coated, on a surface thereof, with an adhesive mixed with a phosphor, since when the LED chip 400 emits the light, the phosphor is excited by the light to generate a corresponding color, the emitted light may irradiate the phosphor on a surface of the chip on adjacent connecting lines, which may interfere with a light emission of the LED chip 400 on the adjacent connecting lines.

For example, one LED filament 410 has three connecting lines 412, corresponding to the LED red light source 421, the LED green light source 422, and the LED blue light source 423. The LED red light source 421 and the LED green light source 422 are arranged adjacent to each other. The LED chip 400 in the LED red light source 421 is a blue chip, and its light emitting principle is that the blue chip in the LED red light source 421 emits blue light and irradiates a surface coated with a red phosphor mixed with an adhesive to excite the red phosphor, thus generating red light. This red light will irradiate a green phosphor mixed with an adhesive on a surface of the adjacent LED green light source 422. The LED green light source 422 originally emits green light, but at this time, it is likely to change a color due to an interference of a red light irradiation, which results in an imbalance and an out-of-control of colors of all the LED filaments 410. The dam-encircling colloid coating 418 can block the light from the adjacent connecting lines 412, and prevent the interference caused by a mutual irradiation from the adjacent connecting lines.

In this embodiment, by providing the dam-encircling colloid coating 418 between two adjacent connecting lines 412, it is possible to prevent a cross color between the two adjacent connecting lines 412, so that the light emitted by the connecting line 412 is of a pure and single color.

Figure 8:
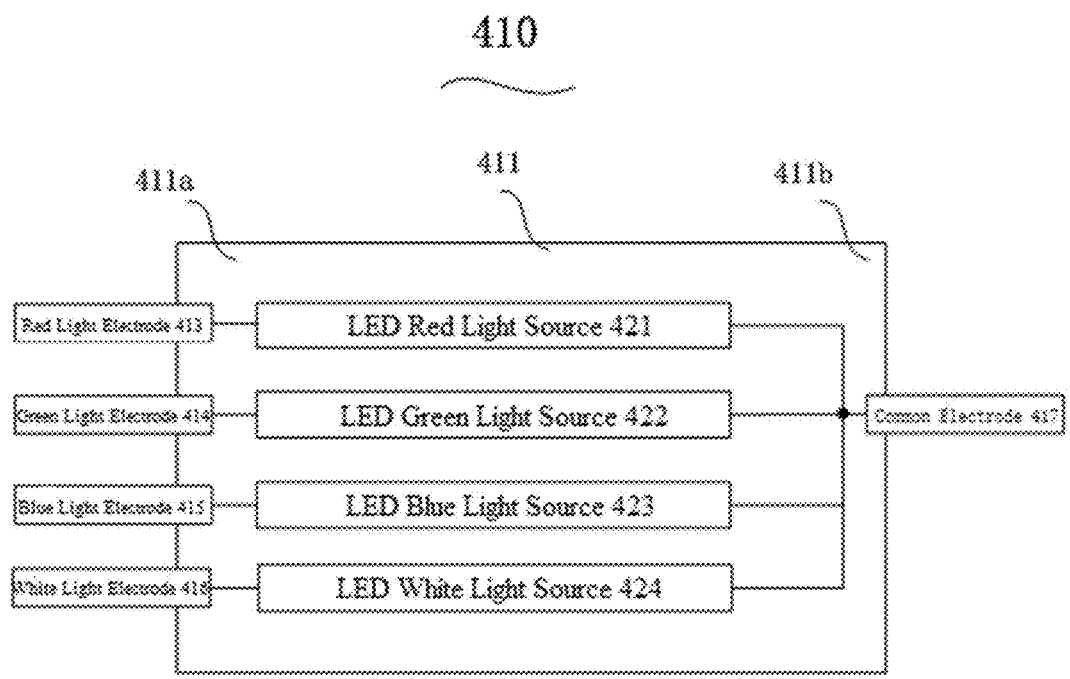
FIG. 8 is a structural schematic diagram of an LED filament in a color-controllable LED luminescent lamp according to an embodiment of the present disclosure.
Figure 9:
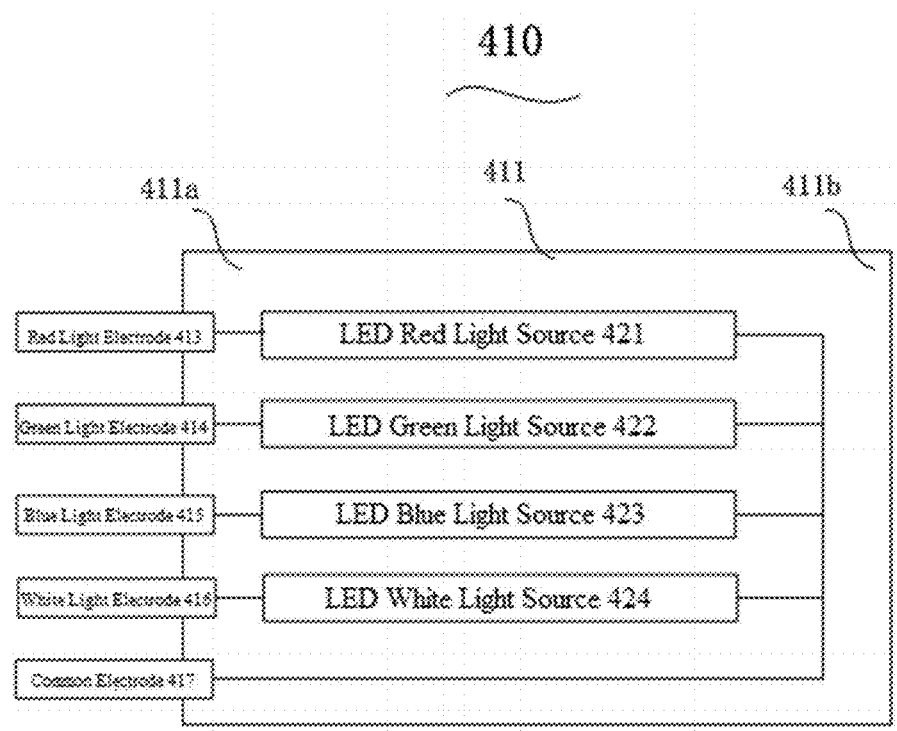
FIG. 9 is a structural schematic diagram of an LED filament in a color-controllable LED luminescent lamp according to an embodiment of the present disclosure.
Figure 10:
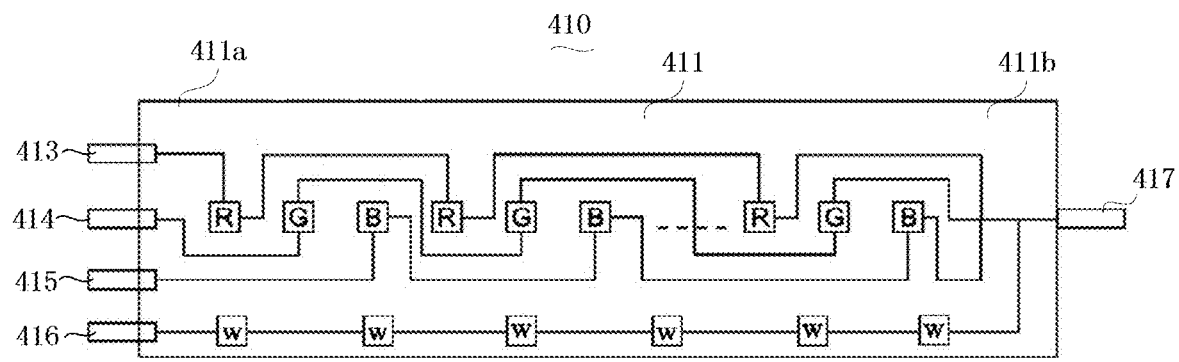
FIG. 10 is a structural schematic diagram of an LED filament in a color-controllable LED luminescent lamp according to an embodiment of the present disclosure.

As shown in FIGS. 8, 9 and 10, in an embodiment of the present disclosure, the LED filament 410 includes a red light electrode 413, a green light electrode 414, a blue light electrode 415, a white light electrode 416 and a common electrode 417. The red light electrode 413 is provided to extend from a first end 411a of the filament substrate 411. The green light electrode 414 is provided to extend from the first end 411a of the filament substrate 411. The blue light electrode 415 is provided to extend from the first end 411a of the filament substrate 411. The white light electrode 416 is provided to extend from the first end 411a of the filament substrate 411. The common electrode 417 is provided to extend from the first end 411a or a second end 411b of the filament substrate 411.

Specifically, there are various implementations of a specific structure of a single LED filament 410. Only one is listed in this embodiment. The filament substrate 411 includes a first end 411a and a second end 411b. In this embodiment, the LED filament 410 includes a red light electrode 413, a green light electrode 414, a blue light electrode 415, a white light electrode 416 and a common electrode 417, that is, this embodiment provides electrodes for four colors, which means that this embodiment also provides connecting lines 412 for the four colors.

A part of each of the red light electrode 413, the green light electrode 414, the blue light electrode 415 and the white light electrode 416 is fixedly connected to the filament substrate, and another part of each of them extends from the first end 411a of the filament substrate 411. A part of the common electrode 417 is fixedly connected to the filament substrate, and the other part thereof is provided to extend from the first end 411a or the second end 411b of the filament substrate 411.

In a wiring mode, the red light electrode 413, the green light electrode 414, the blue light electrode 415, the white light electrode 416 and the common electrode 417 can be arranged on a same side of the filament substrate 411.

In another wiring mode, the red light electrode 413, the green light electrode 414, the blue light electrode 415 and the white light electrode 416 can be arranged on a same side of the filament substrate 411, while the common electrode 417 is arranged on the other side of the filament substrate 411.

FIG. 8 is a schematic diagram of an embodiment in which the electrodes for the four color and the common electrode 417 are arranged on different sides of the filament substrate 411. FIG. 9 is a schematic diagram of an embodiment in which the electrodes for the four color and the common electrode 417 are disposed on the same side of the filament substrate 411.

In this embodiment, by setting an assembling structure and connection relationship of the specific LED filament 410 including the filament substrate 411, the red light electrode 413, the green light electrode 414, the blue light electrode 415, the white light electrode 416 and the common electrode 417, a structure of the LED filament 410 can be reasonable and simple with a minimized cost.

Figure 11:
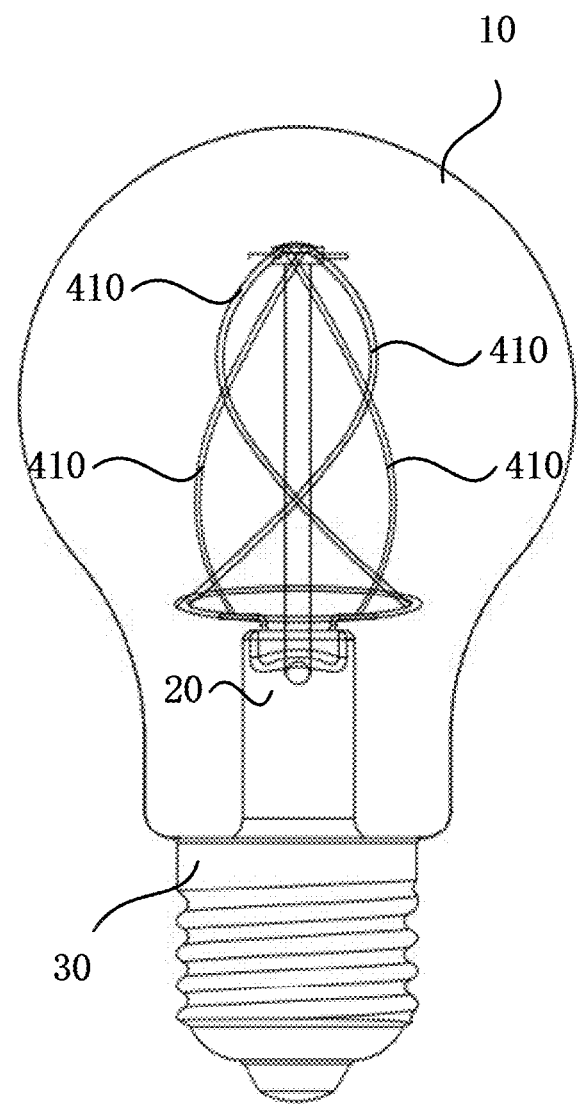
FIG. 11 is a structural schematic diagram of a color-controllable LED luminescent lamp according to an embodiment of the present disclosure.

As shown in FIG. 11, in an embodiment of the present disclosure, the plurality of LED filaments 410 shares a same common electrode 417. The common electrode 417 serves as one or more of the input ends and the output ends of all the LED filaments 410. The second end 411b of the filament substrate 411 for each LED filament 410 is connected to the common electrode 417. The common electrode 417 is fixed to an end of the stem 20. The common electrode 417 is provided to extend from the first end 411a or the second end 411b of the filament substrate 411.

Specifically, in the embodiment shown in FIG. 11, the common electrode 417 is provided to extend from the second end 411b of the filament substrate 411. In the embodiment shown in FIG. 11, the common electrode 417 is provided to from the first end 411a of the filament substrate 411. It can be seen that an end of each of the plurality of LED filaments 410 is connected to a same point, which is caused by a common electrode 417 shared by the plurality of LED filaments 410. The other end of each of the plurality of LED filaments 410 is fixedly connected with the stem 20, thus forming an aesthetic shape.

The plurality of LED filaments 410 is connected in a connection mode in this embodiment, so that the whole LED luminescent lamp is aesthetic in shape, can emit light 360 degrees, and has a good heat dissipation effect.

In an embodiment of the present disclosure, the LED light source 40 includes a plurality of LED filaments 410. The second end 411b of the filament substrate 411 for each LED filament 410 is connected to the same common electrode 417, which is fixedly connected to an end of the stem 20.

First ends 411a of the filament substrates 411 for the plurality of LED filaments 410 all extend rotationally around a same central axis. A rotation angle of the first end 411a of the filament substrate 411 for each LED filament 410 relative to the second end 411b of the filament substrate is greater than 720 degrees.

Specifically, an overall shape of the LED luminescent lamp formed in this embodiment is shown in FIG. 11. By setting the rotation angle of the first end 411a relative to the second end 411b to be greater than 720 degrees, on the one hand, the light emitted by the LED luminescent lamp can be more evenly distributed in the space, make a light-matching curve more perfect. On the other hand, a spot issue can be improved, making a luminescence more uniform and solve a problem of "dark under light". The spot refers to a pattern formed by a vertical irradiation of the light on an illuminated object.

There are many further different layout examples of the LED filament 410 in the LED luminescent lamp.

In the LED luminescent lamp shown in FIG. 1, a single LED filament 410 is provided in the lamp shade 10, and light sources emitting different colors of light are provided in the LED filament 410. The LED filament 410 is wound around the stem 20 to form an aesthetic shape and can emit various colors of light.

Figure 12:
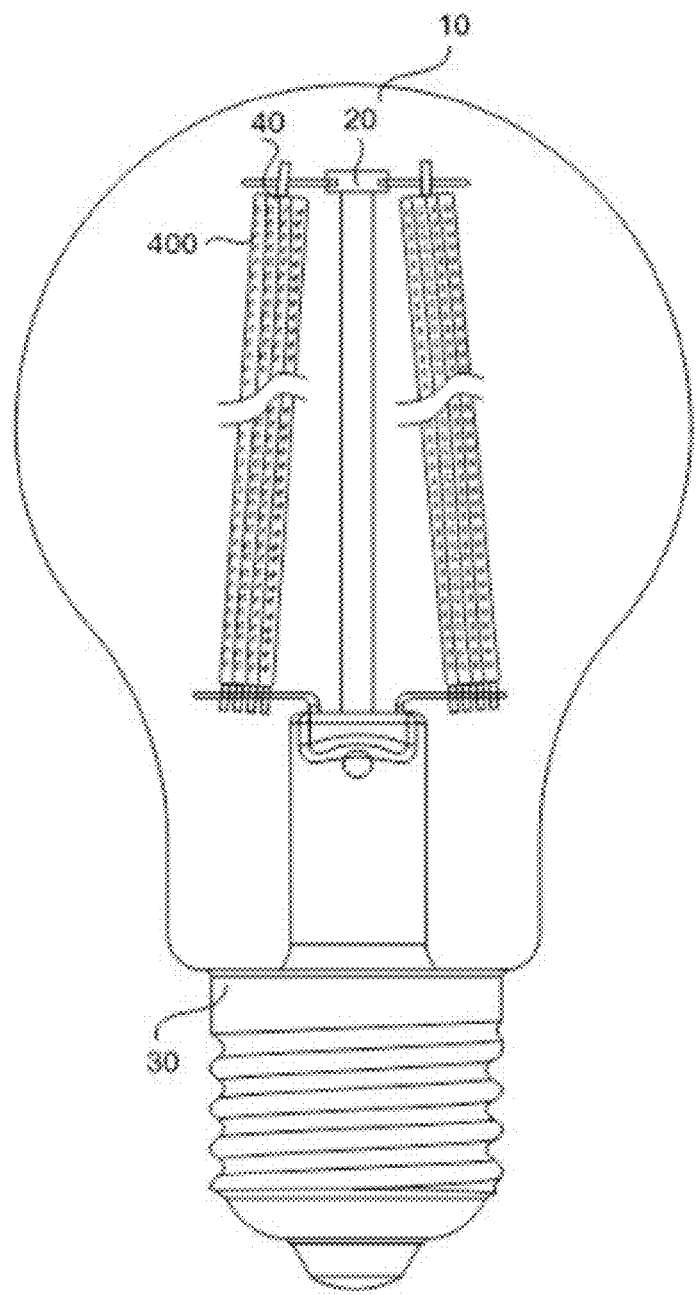
FIG. 12 is a structural schematic diagram of a color-controllable LED luminescent lamp according to an embodiment of the present disclosure.

In the LED luminescent lamp shown in FIG. 12, two LED filaments 410 are provided in the lamp shade 10 and in a relatively conventional distribution mode.

Figure 13:
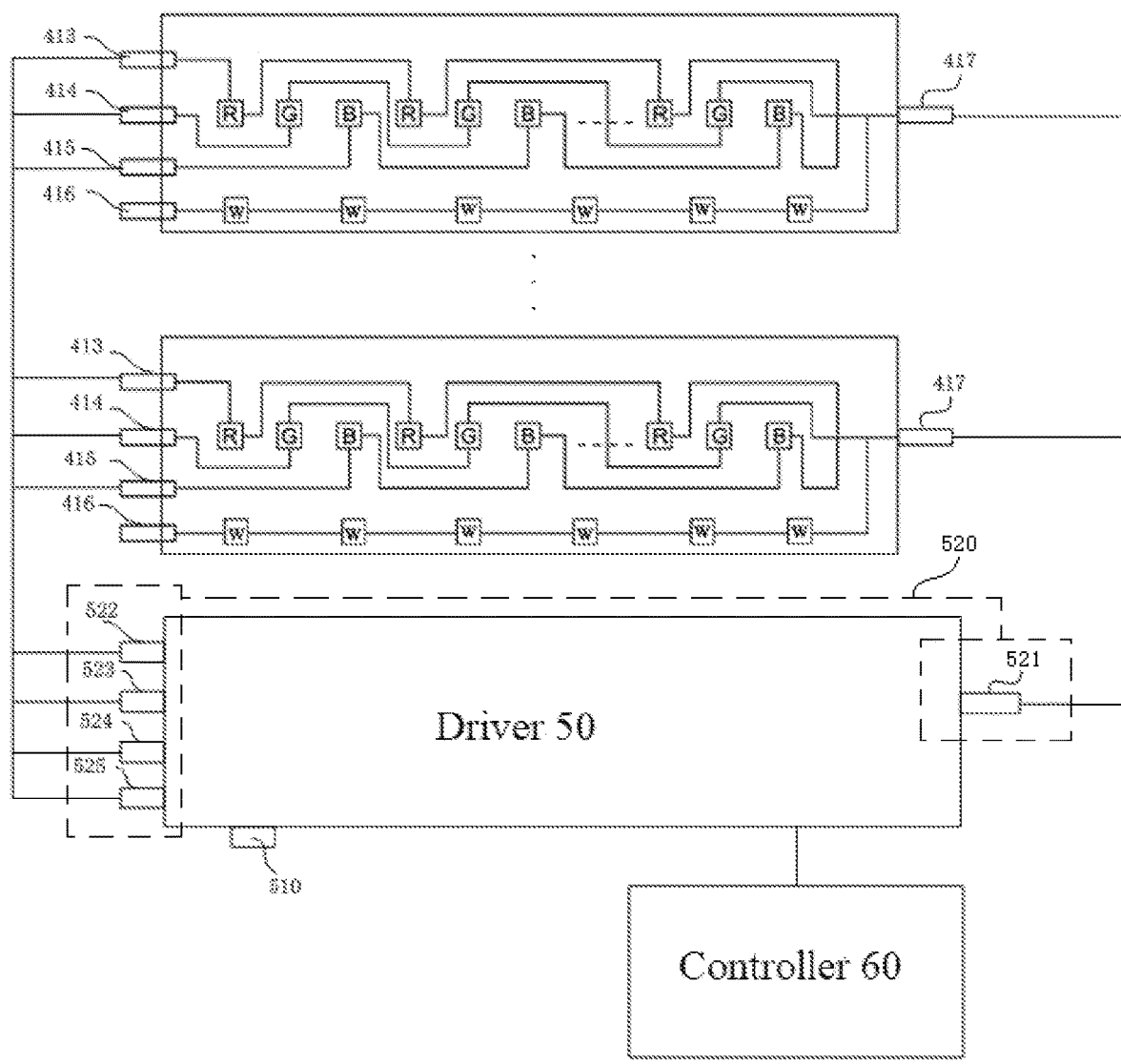
FIG. 13 is a schematic diagram showing a connection of a plurality of LED filaments in a color-controllable LED luminescent lamp according to an embodiment of the present disclosure.

As shown in FIG. 13, in an embodiment of the present disclosure, the color-controllable LED luminescent lamp further includes a driver 50 and a controller 60. The driver 50 is used to drive the light source 40 to emit light with a color. The controller 60 is electrically connected to the driver 50. The controller 60 is used to send a control instruction to the driver 50.

In this embodiment, the plurality of LED filaments 410 can be connected in parallel to form a point light source. Specifically, the plurality of LED filaments 410 is connected in parallel with each other and then electrically connected with the driver 50. The driver 50 can be arranged in the base 30, and after the base 30 and the lamp shade 10 match to form an LED bulb, the driver 50 becomes a part of the LED bulb. The driver 50 may also be arranged outside the LED bulb and electrically connected with the plurality of LED filaments 410 through a wire. The driver 50 can also be externally connected with a controller 60. The previous embodiment also illustrates a connection mode in which the plurality of LED filaments 410 shares the same common electrode 417.

The controller 60 sends the control instruction to the driver 50. According to the control instruction, the driver 50 drives the plurality of LED filaments 410 to emit light so as to exhibit a color.

In addition, the plurality of LED filaments 410 in this embodiment constitutes a point light source, and since the plurality of LED filaments 410 can be accommodated in the lamp shade 10, not only are color combinations increased, but also various appearances can be formed, which is more aesthetic.

In this embodiment, by including the driver 50 and the controller 60, different colors can be exhibited on the whole LED luminescent lamp.

With continued reference to FIG. 13, in an embodiment of the present disclosure, the driver 50 includes an input end 510 of the driver and an output end 520 of the driver. The input end 510 of the driver is used to receive a DC power source or an Ac power source. The output end 520 of the driver is electrically connected to the LED light source 40.

With continued reference to FIG. 13, in an embodiment of the present disclosure, the output end 520 of the driver includes an LED driving electrode 521, a red light driving electrode 522, a green light driving electrode 523, a blue light driving electrode 524 and a white light driving electrode 525. The LED driving electrode 521 is electrically connected to the common electrode 417 of the LED filament 410. The red driving electrode 522 is electrically connected to the red light electrode 413 of the LED filament 410. The green driving electrode 523 is electrically connected to the green light electrode 414 of the LED filament 410. The blue driving electrode 524 is electrically connected to the blue light electrode 415 of the LED filament 410. The white light driving electrode 525 is electrically connected to the white light electrode 416 of the LED filament 410.

Specifically, a driving mode of the driver 50 can be varied, and can be set by burning a driver program in a chip of the driver 50. For example, one driving model is as follows: when the driver 50 controls the LED red light source 421 to operate, and the LED green light source 422, the LED blue light source 423 and the LED white light source 424 not to operate, the LED filament 410 emits red light.

When the driver 50 controls the LED red light source 421 and the LED green light source 422 to operate at the same time, and the LED blue light source 423 and the LED white light source 424 not to operate, the LED filament 410 emits red light and green light at the same time.

When the driver 50 controls the LED red light source 421, LED green light source 422, LED blue light source 423 and LED white light source 424 to operate at the same time, the LED filament 410 emits red light, green light, blue light and white light at the same time.

When the driver 50 controls operating currents of the red light driving electrode 522, the green light driving electrode 523, the blue light driving electrode 524 and the white light driving electrode 525 to change, brightness of the red light, the green light, the blue light and the white light emitted by the LED filament 410 changes, resulting in different color effects.

In this embodiment, the driver 50 is provided to include a power interface 510, the LED driving electrode 521, the red light driving electrode 522, the green light driving electrode 523, the blue light driving electrode 524 and the white light driving electrode 525, so that the driver 50 can freely control an exhibition of different colors and a free switching of any color for the LED filament 410 by controlling operating states and currents of the red light driving electrode 522, the green light driving electrode 523, the blue light driving electrode 524 and the light white driving electrode 525.

Figure 14:
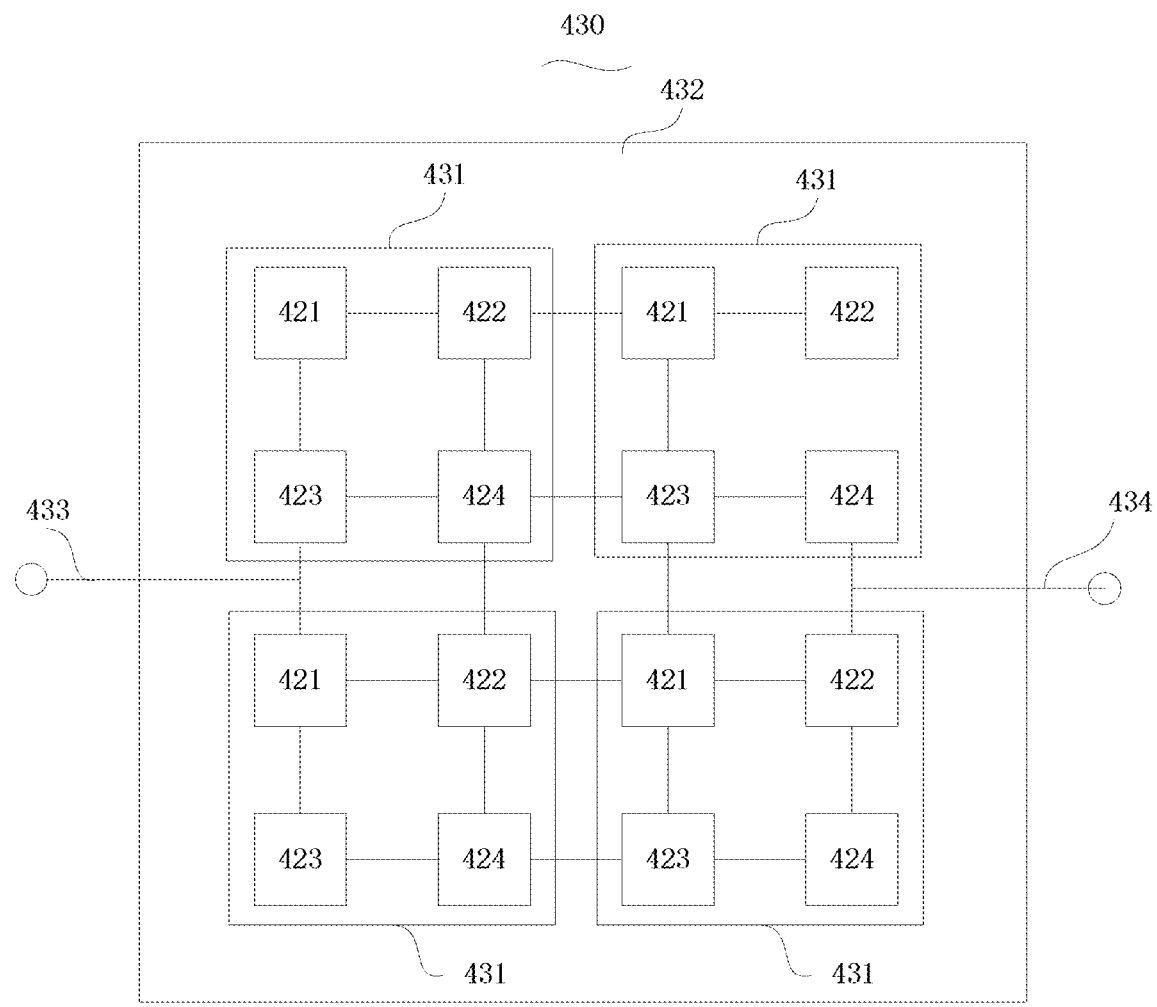
FIG. 14 is a structural schematic diagram of a light emitting array in a color-controllable LED luminescent lamp according to an embodiment of the present disclosure.

As shown in FIG. 14, in an embodiment of the present disclosure, the LED light source 40 is a light emitting array 430. The light emitting array 430 is fixedly connected with the stem 20, for displaying a field or graphic with a color. The light emitting array 430 is composed of a plurality of light emitting units 431 and an array substrate 432, and the plurality of light emitting units 431 is arranged on the array substrate 432 in an array and fixed on the array substrate 432.

Specifically, in the foregoing embodiment, the plurality of LED filaments 410 forms the point light source in the lamp shade 10. In this embodiment, the LED light source 40 is a light emitting array 430. Since the light emitting array 430 can display the field or graphic with the color, in this embodiment, the light emitting array 430 constitutes a planar light source in the lamp shade 10.

In this embodiment, by providing the light emitting array 430 in the lamp shade 10, the light emitting array 430 can be used not only for illumination, but also for displaying the field or graphic with the color.

With continued reference to FIG. 14, in an embodiment of the present disclosure, the light emitting unit 431 is composed of one or more of the LED red light source 421, the LED green light source 422, the LED blue light source 423 and the LED white light source 424.

Specifically, in an embodiment, each light emitting unit 431 is composed of four light sources, namely, the LED red light source 421, the LED green light source 422, the LED blue light source 423 and the LED white light source 424.

In this embodiment, the light emitting unit 431 is composed of one or more of the LED red light source 421, the LED green light source 422, the LED blue light source 423 and the LED white light source 424, so that the whole LED luminescent lamp can exhibit fields or graphics with colors, and a free exhibiting and switching of fields or graphics with multiple colors can be realized.

With continued reference to FIG. 14, in an embodiment of the present disclosure, the light emitting array 430 further includes an input end 433 of the array and an output end 434 of the array. A part of the input end 433 of the array is fixed to the array substrate 432. Another part of the input end 433 of the array extends from the array substrate 432. The input end 433 of the array is connected to the output end 520 of the driver.

A part of the output end 434 of the array is fixed to the array substrate 432. Another part of the output end 434 of the array extends from the array substrate 432. The output end 434 of the array is fixedly connected with the stem 20.

Specifically, this embodiment illustrates that the light emitting array 430 has the input end 433 of the array and the output end 434 of the array, which can be connected with external components.

In an embodiment of the present disclosure, the array substrate 432 is a flexible substrate, so that the light emitting array 430 can be bent or folded.

Specifically, the filament substrate 411 may be made of a flexible material.

In this embodiment, by providing the array substrate 432 to be the flexible substrate, the light emitting array 430 can be freely bent and folded.

Figure 15:
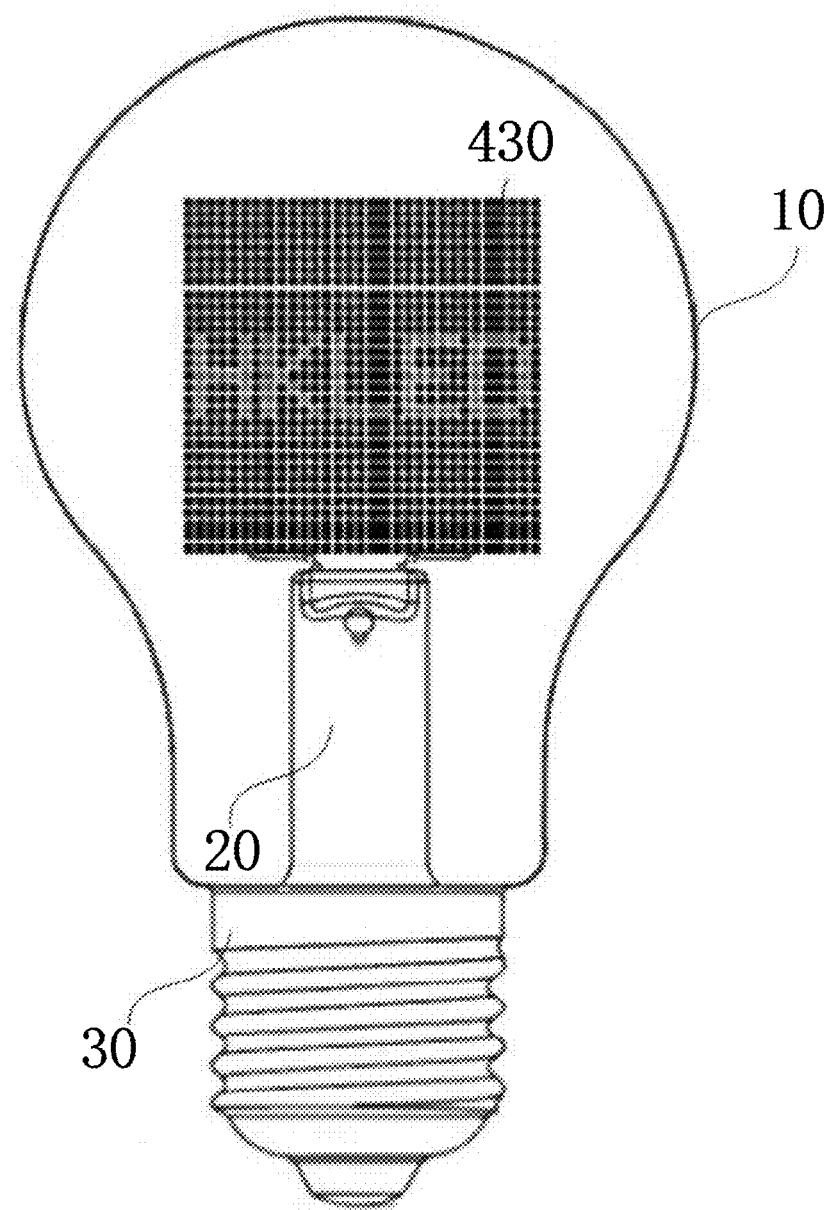
FIG. 15 is a structural schematic diagram of a color-controllable LED luminescent lamp according to an embodiment of the present disclosure.

As shown in FIG. 15, in an embodiment of the present disclosure, the light emitting array 430 is provided in a bendable curved structure so as to be inserted into an interior of the lamp shade 10 from an inlet of the lamp shade 10. Further, the light emitting array 430 may extend inside the lamp shade 10 to form a two-dimensional planar structure or a three-dimensional structure.

Specifically, the light emitting array 430 is firstly fixed at a point on a pin of the stem, and then bent to form a curved structure. The light emitting array 430 can also be configured to be bent into other shapes, so that the flexible light emitting array 430 can be inserted into the interior of the lamp shade 10.

After entering the interior of the lamp shade 10, the light emitting array 430 can be extended into a planar light emitting array 430, that is, a two-dimensional planar structure. The light emitting array 430 can also be extended into a three-dimensional structure formed in a three-dimensional space. For example, it can be extended into a cylinder, a sphere, a polyhedron, a shell with a curved surface or the like.

Of course, the light emitting array 430 can be used not only to exhibit a field or graphic with a color, but also to emit one color of light together to serve as a point light source for illumination.

Figure 16:
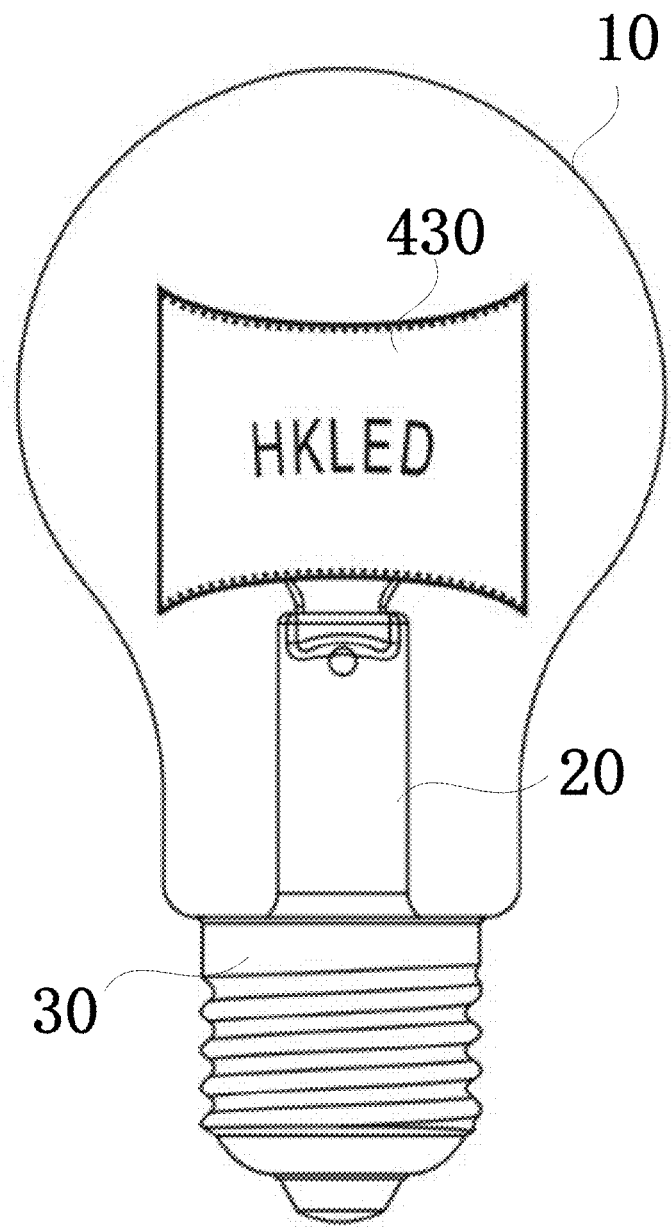
FIG. 16 is a structural schematic diagram of a color-controllable LED luminescent lamp according to an embodiment of the present disclosure.
Figure 17:
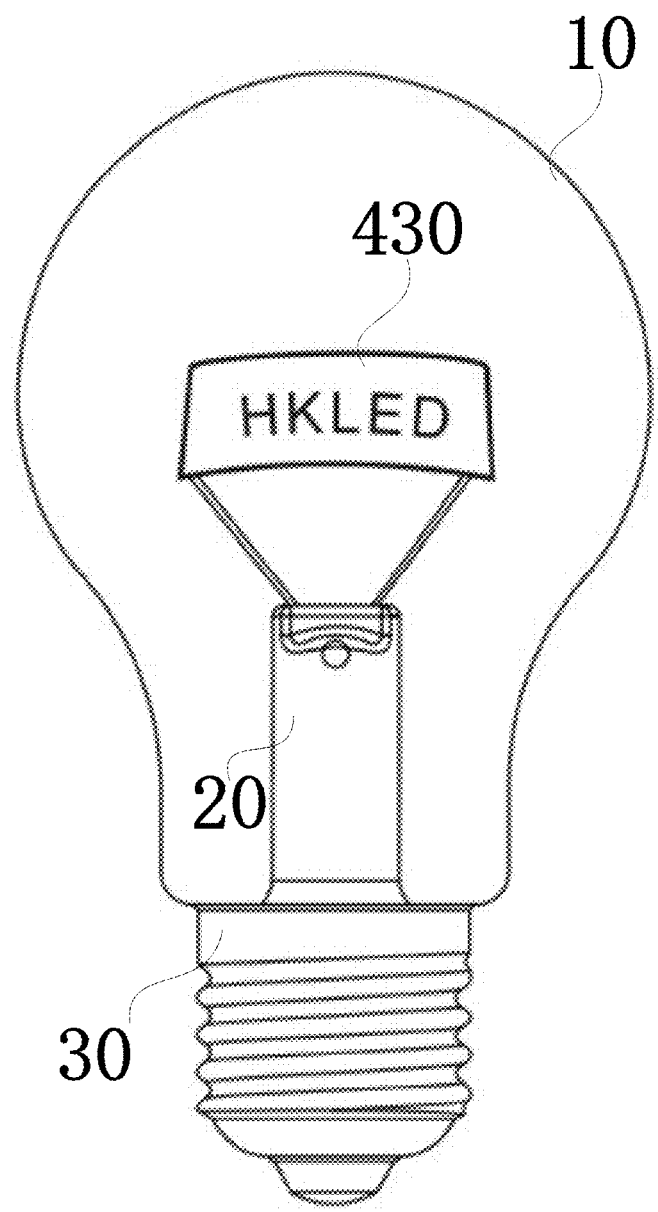
FIG. 17 is a structural schematic diagram of a color-controllable LED luminescent lamp according to an embodiment of the present disclosure.

FIGS. 16 and 17 are embodiments in which the light emitting array 430 presents other shapes.

In this embodiment, by setting a bent shape of the light emitting array 430 and a size of a neck of the lamp shade 10, the light emitting array 430 and the lamp shade 10 can be produced separately in batches.

The technical features of the above-mentioned embodiments can be combined in an arbitrary manner, and an execution sequence of steps of the method is not limited. For simplicity of description, not all of the possible combinations of the technical features in the embodiments described above are described, however, as long as there is no contradiction between these combinations of the technical features, the combinations should be considered as falling within the scope of this specification.

The above-mentioned embodiments only represent several embodiments of this disclosure, and their descriptions are specific and detailed, but they should not be understood as limiting the scope of this disclosure as such. It should be noted that, several modifications and improvements can be made for those of ordinary skill in the field without departing from the concept of this disclosure, which belong to the protection scope of this disclosure. Therefore, the protection scope of this disclosure shall be subjected to the appended claims.

What is claimed is:

1. A color-controllable LED luminescent lamp, wherein the color-controllable LED luminescent lamp comprises:
    a lamp shade;
    a stem fixedly connected with the lamp shade;
    a base fixedly connected with the lamp shade; and
    at least one LED light source fixedly connected with the stem;
    wherein a plurality of LED chips is provided inside the LED light source, and a chip width of one of the LED chips ranges from more than 25.4 microns to less than 600 microns;
    wherein the LED light source is an LED filament or a light emitting array;
    wherein the LED filament includes a filament substrate, a plurality of connecting lines being provided on the filament substrate, a plurality of LED chips are provided on each of the connecting lines, and two adjacent LED chips are connected with each other through a wire, and a dam-encircling colloid coating is provided between two adjacent connecting lines to prevent a cross color between the two adjacent connecting lines;
    wherein a diameter of a single LED filament may be less than 1.5 mm, and one end of each of the plurality of LED filaments is connected to a same point, the other end of each of the plurality of LED filaments is fixedly connected with the stem;
    wherein the LED light source is a light emitting array which is fixedly connected with the stem for displaying a field or graphic with a color, the light emitting array being composed of a plurality of light emitting units and an array substrate, and the plurality of light emitting units being arranged on the array substrate in an array and fixed on the array substrate, the array substrate is a flexible substrate, so that the light emitting array is capable of being bent or folded, the light emitting array is provided in a bendable curved structure so as to be inserted into an interior of the lamp shade from an inlet of the lamp shade, the light emitting array being capable of extending inside the lamp shade to form a two-dimensional planar structure or a three-dimensional structure;
    wherein the light emitting array further includes an input end of the array and an output end of the array, a part of the input end of the array and a part of the output end of the array are fixed to the array substrate, another part of the input end of the array and another part of the output end of the array extend from the array substrate, the input end of the array and the output end of the array are connected to an external component.

2. The color-controllable LED luminescent lamp according to claim 1, wherein one or more of a LED red light source, a LED green light source, a LED blue light source and a LED white light source are provided in the LED light source.

3. The color-controllable LED luminescent lamp according to claim 2, wherein the LED red light source, the LED green light source, the LED blue light source and the LED white light source are manufactured from LED chips coated, on a surface thereof, with an adhesive mixed with a phosphor.

4. The color-controllable LED luminescent lamp according to claim 3, wherein the LED light source is the LED filament, each of the connecting lines being one of the LED red light source, the LED green light source, the LED blue light source and the LED white light source, and each of the connecting lines being independently controlled to control the LED filament to emit a specific color of light.

5. The color-controllable LED luminescent lamp according to claim 1, wherein the LED filament comprises:
    a red light electrode provided to extend from a first end of the filament substrate;
    a green light electrode provided to extend from the first end of the filament substrate;
    a blue light electrode provided to extend from the first end of the filament substrate;
    a white light electrode provided to extend from the first end of the filament substrate; and
    a common electrode provided to extend from the first end or a second end of the filament substrate.

6. The color-controllable LED luminescent lamp according to claim 5, wherein the plurality of LED filaments shares a same common electrode, the common electrode serving as one or more of input ends and output ends of all the LED filaments;

the second end of the filament substrate for each LED filament being connected with the common electrode, and the common electrode being fixedly connected with an end of the stem; and the common electrode being provided to extend from the first end or the second end of the filament substrate.

7. The color-controllable LED luminescent lamp according to claim 6, wherein the LED light source comprises the plurality of LED filaments, the second end of the filament substrate for each LED filament being connected with a same common electrode, and the common electrode being fixedly connected with the end of the stem; and first ends of the filament substrates for a plurality of LED filaments all extending rotationally around a same central axis, and a rotation angle of the first end of the filament substrate for each LED filament relative to the second end of the filament substrate being greater than 720 degrees.

8. The color-controllable LED luminescent lamp according to claim 2, wherein each of the connecting lines being one of the LED red light source, the LED green light source, the LED blue light source and the LED white light source, and each of the connecting lines being independently controlled to control the LED filament to emit a specific color of light.

9. The color-controllable LED luminescent lamp according to claim 1, wherein the LED filament comprises:

a red light electrode provided to extend from a first end of the filament substrate;

a green light electrode provided to extend from the first end of the filament substrate;

a blue light electrode provided to extend from the first end of the filament substrate;

a white light electrode provided to extend from the first end of the filament substrate; and a common electrode provided to extend from the first end or a second end of the filament substrate.

10. The color-controllable LED luminescent lamp according to claim 9, wherein the plurality of LED filaments shares a same common electrode, the common electrode serving as one or more of input ends and output ends of all the LED filaments;

the second end of the filament substrate or each LED filament being connected with the common electrode, and the common electrode being fixedly connected with an end of the stem; and the common electrode being provided to extend from the first end or the second end of the filament substrate.

11. The color-controllable LED luminescent lamp according to claim 10, wherein the LED light source comprises the plurality of LED filaments, the second end of the filament substrate for each LED filament being connected with a same common electrode, and the common electrode being fixedly connected with the end of the stem; and first ends of the filament substrates for a plurality of LED filaments all extending rotationally around a same central axis, and a rotation angle of the first end of the filament substrate for each LED filament relative to the second end of the filament substrate being greater than 720 degrees.

12. The color-controllable LED luminescent lamp according to claim 1, wherein the light emitting array further comprises:

an input end of the array, a part of which is fixed on the array substrate and another part of which extends from the array substrate, the input end of the array being connected with a driver; and an output end of the array, a part of which is fixed on the array substrate and another part of which extends from the array substrate, the output end of the array being fixedly connected with the stem.

* * * * *